(12) United States Patent
Takada

(10) Patent No.: US 7,671,108 B2
(45) Date of Patent: Mar. 2, 2010

(54) INK AND PRINTER MATTER

(75) Inventor: Naoto Takada, Tokyo (JP)

(73) Assignee: Teikoku Printing Inks Mfg. Co., Ltd., Tokyo (JP)

( * ) Notice: Subject to any disclaimer, the term of this patent is extended or adjusted under 35 U.S.C. 154(b) by 815 days.

(21) Appl. No.: 11/500,758

(22) Filed: Aug. 8, 2006

(65) Prior Publication Data

US 2006/0266261 A1 Nov. 30, 2006

(51) Int. Cl.
*C09D 11/00* (2006.01)
(52) U.S. Cl. .................. 523/160; 523/161; 524/441; 106/31.9
(58) Field of Classification Search ........................ None
See application file for complete search history.

(56) References Cited

U.S. PATENT DOCUMENTS

2004/0103816 A1* 6/2004 Suzuki ..................... 106/31.13

FOREIGN PATENT DOCUMENTS

| JP | S62-45905 | 6/1983 |
| JP | 3151606 | 6/1998 |
| JP | H10-158561 | 6/1998 |
| JP | 2004-175965 | 6/2004 |
| WO | WO 9935194 A1 * | 7/1999 |

OTHER PUBLICATIONS

Kenny, Jack: https://www.entrepreneur.com/ tradejournals/article/print/109568647.html (Date: Sep. 2003).*
Alfa Aesar Ultrathin Aluminum Foil Product, Item #40682 (Date not available).*
MSDS for 1-methoxy-2-propanol.*
Product Brochure for 3-Methyl-3-Methoxy-1-Butanol from Kuraray (2008).*

* cited by examiner

*Primary Examiner*—David Wu
*Assistant Examiner*—Vu Nguyen
(74) *Attorney, Agent, or Firm*—Richard M. Goldberg

(57) ABSTRACT

A printing ink including 100 parts by weight of an aluminum foil, 3 to 200 parts by weight of a binder polymer, and 600 to 2500 parts by weight of a solvent, wherein the aluminum foil contains aluminum foils with thicknesses of 0.03 μm or less and foil surface areas of 1.5 μm$^2$ to 1500 μm$^2$ in an amount of 80% or more based on an accumulated foil surface area, and having a viscosity of 1000 to 3000 cps (measured at 20° C. with a BM-type rotational viscometer) to keep a clearance on a thin outline with a width of 0.15 mm, and a printed matter printed on a surface of a transparent substrate with the ink and viewed as a front face opposite the printed face thereof.

11 Claims, No Drawings

INK AND PRINTER MATTER

FIELD OF THE INVENTION

The present invention relates to printed matter having high specular gloss, inks to be used for producing the printed matter, and printed matter using the inks.

BACKGROUND OF THE INVENTION

It is well known that metallic inks can be prepared by addition of aluminum foils to printing inks. Printed matter printed with a metallic ink, however, generates glittering parts in fine regions, resulting in insufficient specular gloss.

To solve such a problem, the applicant of the invention has proposed inks having the following composition in Japanese Patent Application No. H08-331465:

(1) An ink including 100 parts by weight of an aluminum foil, 15 to 200 parts by weight of a binder polymer, and 600 to 3000 parts by weight of a solvent, wherein the aluminum foil contains aluminum foils with thicknesses of 0.5 μm or less and foil surface areas of 20 μM$^2$ to 2000 μM$^2$ in an amount of 75% or more; and (2) An ink including 100 parts by weight of an aluminum foil, 15 to 2000 parts by weight of a binder polymer, and 600 to 3000 parts by weight of a solvent, wherein the aluminum foil contains aluminum foils with thicknesses of 0.3 μm or less and foil surface areas of 20 μm$^2$ to 2000 μm$^2$ in an amount of 75% or more:

and, in the above compositions, the viscosity of the inks is preferred in the range of 50 to 1000 cps (measured at 20° C. with a BM-type rotational viscometer). Such compositions and viscosity range are disclosed in Japanese Unexamined Patent Publication No. H10-158561 (Patent Document 1) and U.S. Pat. No. 3,151,606.

The above-mentioned prior invention (hereinafter, referred to as the "applicant's prior invention") can provide significantly high specular gloss as well as, within a preferred viscosity range, prevent sagging in terms of keeping contours of printed regions, and also realize highly qualified specular prints.

Further improvements are, however, expected with the applicant's prior invention in regard to enhancement of the specular gloss by further selecting a thickness of aluminum foils, and to prevent sagging by further defining the lower limit value of the viscosity for keeping not only contours in printed images but also clearances between thin lines (specifically, a clearance of 0.15 mm).

On the other hand, Japanese Examined Patent Publication No. S62-45905 (Patent Document 2) discloses inks which contain aluminum foils with thicknesses of 0.035 to 0.045 μm and foil surface areas of 20 μm$^2$ to 2000 μm$^2$ in an amount of 90% (Example 8), and are composed of 100 parts by weight of the aluminum foils, 20 parts by weight of a binder polymer of nitrocellulose (Example 9), and 2770 parts by weight of a solvent selected from ethylcellosolve, MEK, methylcellosolve, and toluene (Examples 6, 8, and 9).

However, if the ink composition disclosed in the above-described Japanese Examined Patent Publication is applied, test results obtained by the inventors of the present invention according to such compositions have shown that the ink obtained had a viscosity of 17 cps or less (measured at 20° C. with a BM-type rotational viscometer) by causing significant sagging. With regard to this point, improvements are necessary to solve this problem.

DISCLOSURE OF THE INVENTION

Problems to be Solved by the Invention

The present invention intends to provide an ink and a printed matter using the ink; the ink will be improved in its specular gloss by further selecting a thickness of the aluminum foils which were applied in the applicant's prior invention as well as, with a basic composition based on the above improvement, be able to prevent sagging in terms of keeping a clearance on a thin outline with a width of 0.15 mm by adequately selecting the lower limit value of the ink viscosity.

Means for Solving the Problem

The present invention is, to solve the above-mentioned problems, a printing ink including 100 parts by weight of an aluminum foil, 3 to 200 parts by weight of a binder polymer, and 600 to 2500 parts by weight of a solvent, wherein the aluminum foil contains aluminum foils with thicknesses of 0.02 μm or less and foil surface areas of 1.5 μm$^2$ to 1500 μm$^2$ in an amount of 80% or more based on an accumulated foil surface area, and having a viscosity of 1000 to 3000 cps (measured at 20° C. with a BM-type rotational viscometer) to keep a clearance on a thin outline with a width of 0.15 mm.

EFFECTS OF THE INVENTION

The invention can provide an ink and a printed matter applied with the ink for a printed matter being viewed as a front face opposite the printed face thereof or the like; the ink being provided by conducting a selection within the applicant's prior invention to exhibit highly enhanced specular gloss without causing sagging in terms of keeping contours of printed images, and by preventing sagging in terms of keeping a clearance on a thin outline with a width of 0.15 mm by defining a further lower viscosity limit value as mentioned in the above preferred viscosity range.

BEST MODE FOR CARRYING OUT THE INVENTION

The invention requires that the aluminum foil includes aluminum foils with thicknesses of 0.03 μm or less, and preferably 0.02 μm or less and foil surface areas of 1.5 μm$^2$ to 1500 μm$^2$ with occupation of 80% or more based on an accumulated foil surface area; however, when the foils have a thickness of 0.03 μm or less, their surface area mostly falls within the area range mentioned above.

Therefore, when the foils have a thickness of 0.03 μm, the above-mentioned requirement of 80% or more based on an accumulated foil surface area is substantially identical to the requirement that the aluminum foils have thicknesses of 0.03 μm or less; on the contrary, when the foils have a thickness of 0.02 μm or less, the above-mentioned requirement of 80% or more corresponds to both requirements of the thickness and foil surface area.

With regard to the foil area range, when a volume of the aluminum foils with surface areas of 1.5 μm$^2$ or less becomes large, it is difficult to obtain high specular gloss; on the other hand, when a volume of the aluminum foils with surface areas of 1500 μm$^2$ or more becomes large, it tends to generate printing streaks or unevenness.

When an ink is composed of 100 parts by weight of an aluminum foil containing aluminum foils having the above-mentioned thickness range and foil surface area range in an amount of 80% or more, with 3 to 200 parts by weight of a resin which is a binder and 600 to 2500 parts by weight of a solvent, the ink can be further up-graded in its specular gloss level than that of the applicant's prior invention.

In the invention, the viscosity is required to be in the range of 1000 to 3000 cps (measured at 20° C. with a BM-type rotational viscometer).

The requirement of the lower limit value, i.e. 1000 cps, is required to keep a clearance on a thin outline with a width of 0.15 mm.

The upper limit value, i.e. 3000 cps, represents a limit value to print without causing printing unevenness for any kind of printing method such as gravure printing, screen printing, and flexographic printing; such a limit value is derived from experimental data obtained by the inventors under trial and error.

In the ink of the invention, 3 to 200 parts by weight, and preferably 3 to 150 parts by weight of a binder polymer is used to 100 parts by weight of the aluminum foil. When a volume of the binder polymer is less than 3 parts by weight, printability of the ink is reduced and durability of an ink layer printed is significantly deteriorated. When a volume of the binder polymer is 200 parts by weight or more, a decrease in specular gloss of a printed matter is observed.

Every polymer applicable as a binder for printing inks can be used for the binder polymer. For example, included are polyester resins, polyurethane resins, acrylic resins, vinyl chloride-vinyl acetate copolymers, cellulose derivative resins, polycarbonate resins, polyvinyl butyral resins, polyamide resins, and epoxy resins; at least one resin thereof can be applicable.

Solvents to be used are those dissolving the binder polymers mentioned above or diluting such dissolved solution; as general examples, selectable are esters, ethers, ketones, alcohols, polyhydric alcohol derivatives, and aromatic hydrocarbons.

Especially, 3-methyl-3-methoxy-1-butanol is usually often used because it is often contained in an aluminum foil slurry of pre-manufactured commercial products, does not have any specific toxicities, and hardly dissolves a printing surface of a printing substrate.

Total amount of solvents and diluents used is 600 to 2500 parts by weight to 100 parts by weight of the aluminum foil. When being 600 parts by weight or less, reduction of specular gloss of a printed matter is observed; and when being 2500 parts by weight or more, printability of the ink is deteriorated.

Although an upper limit of a relative volume of the solvent in the applicant's prior invention is 3000 parts by weight, the inventors have altered the value of 3000 parts by weight, in the upper limit value of the applicant's prior invention, to 2500 parts by weight since the above-mentioned printability of the ink of this invention is slightly reduced in the range of 2500 to 3000 parts by weight.

In the ink of the invention, transparent or semi-transparent colored pigments or extender pigments, pearl pigments, and other metal powders are also allowed to be added to change a color tone of specular gloss of a printed matter. Also, when needed, leveling agents and defoaming agents normally used for typical inks are also permitted to be added to the ink.

Examples and Comparative Examples of the invention are explained as follows.

EXAMPLE 1

An ink was produced by adding 100 parts by weight of an aluminum foil containing aluminum foils with a thickness of 0.03 μm and foil surface areas of 1.5 μm$^2$ to 1500 μm$^2$ in an amount of 80% or more, with binders including 55 parts by weight of a polyurethane resin and 14 parts by weight of a cellulose derivative resin, and solvents including 1400 parts by weight of 3-methoxy-3-methyl-1-butanol and 100 parts by weight of cyclohexanone. The viscosity of the ink was 1000 cps.

The ink produced was printed on a back face of a transparent polyester film by screen printing, and a luminance of the printed film was determined (by "Luminance Meter DM-7" commercially available from TOPCON CORPORATION), resulting in 4.44 Cd/cm$^2$, and significantly high specular gloss was visually observed.

The printed image maintained clear contours as well as clearances on the thin outline with a width of 0.15 mm, and sagging generations were prevented in both cases.

EXAMPLE 2

An ink was produced by adding 100 parts by weight of an aluminum foil containing aluminum foils with a thickness of 0.02 μm and foil surface areas of 1.5 μm$^2$ to 1500 μm$^2$ in an amount of 80% or more, with binders including 80 parts by weight of a polyurethane resin and 20 parts by weight of a polyester resin, and solvents including 1700 parts by weight of 3-methoxy-3-methyl-1-butanol and 100 parts by weight of propyleneglycol monomethylether. The viscosity of the ink was 3000 cps.

The ink produced was printed on a back face of a transparent polyester film by screen printing, and a luminance of the printed film was determined (by "Luminance Meter DM-7" commercially available from TOPCON CORPORATION), resulting in 5.32 Cd/cm$^2$, and significantly high specular gloss was visually observed.

The printed image maintained clear contours as well as clearances on the thin outline with a width of 0.15 mm, and sagging generations were prevented in both cases.

COMPARATIVE EXAMPLE 1

According to the applicant's prior invention, an ink was produced by adding 100 parts by weight of an aluminum foil containing aluminum foils with a thickness of 0.1 μm and foil surface areas of 1.5 μm$^2$ to 1500 μm$^2$ in an amount of 80% or more, with binders including 30 parts by weight of a polyester resin and 15 parts by weight of a cellulose derivative resin, and solvents including 600 parts by weight of cyclohexanone and 500 parts by weight of propyleneglycol monomethylether. The viscosity of the ink was 700 cps.

The ink produced was printed on a back face of a transparent polyester film by screen printing, and a luminance of the printed film was determined (by "Luminance Meter DM-7" commercially available from TOPCON CORPORATION), resulting in 2.19 Cd/cm$^2$. This result was worse in luminance than that of Examples 1 and 2, and the specular gloss obtained was not as high as that of the Examples.

The printed image maintained clear contours but failed to completely keeping a clearances on the thin outline with a width of 0.15 mm, and sagging was little generated.

COMPARATIVE EXAMPLE 2

An ink similar to an ink disclosed in Patent Document 2 was produced by adding 100 parts by weight of an aluminum foil containing aluminum foils with a thickness of 0.03 μm and foil surface areas of 1.5 μm$^2$ to 1500 μm$^2$ in an amount of 80% or more, with a binder of 20 parts by weight of a nitrocellulose resin, and solvents including 1420 parts by weight of ethylcellosolve, 900 parts by weight of 3-methoxy-3-methyl-1-butanol, and 450 parts by weight of methyl ethyl ketone. The viscosity of the ink was 17 cps.

The ink produced was printed on a back face of a transparent polyester film by screen printing, and a luminance of the printed film was determined (by "Luminance Meter DM-7" commercially available from TOPCON CORPORATION), resulting in 5.25 Cd/cm². A specular gloss as high as that of Example 2 was obtained.

However, the printed image was unable to maintain clear contours, and completely impossible to maintain clearances on the thin outline with a width of 0.15 mm, and sagging generations were found in both cases.

COMPARATIVE EXAMPLE 3

An ink was produced by adding 100 parts by weight of an aluminum foil containing aluminum foils with a thickness of 0.1 μm and foil surface areas of 1.5 μm² to 1500 μm² in an amount of 80% or more, with binders including 15 parts by weight of an acrylic resin and 15 parts by weight of a cellulose derivative resin, and solvents including 1500 parts by weight of 3-methoxy-3-methyl-1-butanol, 600 parts by weight of methyl ethyl ketone, and 300 parts by weight of cyclohexanone. The viscosity of the ink was 25 cps.

The ink produced was printed on a back face of a transparent polyester film by screen printing, and a luminance of the printed film was determined (by "Luminance Meter DM-7" commercially available from TOPCON CORPORATION), resulting in 2.10 Cd/cm². This result was worse in luminance than that of Examples 1 and 2, and the specular gloss obtained was not as high as that of the Examples.

Moreover, the printed image was unable to maintain clear contours, and completely impossible to maintain clearances on the thin outline with a width of 0.15 mm, and sagging generations were found in both cases.

INDUSTRIAL APPLICABILITY

The ink of the invention is used for printing on a back face where an opposite face of the face printed is viewed as a front face, thereby being utilized to obtain a printed matter having high specular gloss and fine printing images.

What is claimed is:

1. A printing ink comprising 100 parts by weight of an aluminum foil, 3 to 200 parts by weight of a binder polymer, and 600 to 2500 parts by weight of a solvent, wherein the aluminum foil contains aluminum foils with thicknesses of 0.03 μm or less and foil surface areas of 1.5 μm² to 1500 μm² in an amount of 80% or more based on an accumulated foil surface area, and having a viscosity of 1000 to 3000 cps (measured at 20° C. with a BM-type rotational viscometer) with the amount and kind of said binder polymer and said solvent selected to keep a clearance on a thin outline with a width of 0.15 mm.

2. The printing ink according to claim 1 wherein the aluminum foils have thicknesses of 0.02 μm or less.

3. The printing ink according to claim 1 wherein the solvent contains 3-methyl-3-methoxy-1-butanol in an amount of 20% by weight or more.

4. The printing ink according to claim 1 wherein the binder contains at least one resin selected from the group consisting of polyester resins, polyurethane resins, acrylic resins, vinyl chloride-vinyl acetate copolymers, cellulose derivative resins, polycarbonate resins, polyvinyl butyral resins, polyamide resins, and epoxy resins.

5. The printing ink according to claim 1, wherein the ink is applied to screen printing, gravure printing, and flexographic printing.

6. The printing ink according to claim 2 wherein the solvent contains 3-methyl-3-methoxy-1-butanol in an amount of 20% by weight or more.

7. The printing ink according to claim 2 wherein the binder contains at least one resin selected from the group consisting of polyester resins, polyurethane resins, acrylic resins, vinyl chloride-vinyl acetate copolymers, cellulose derivative resins, polycarbonate resins, polyvinyl butyral resins, polyamide resins, and epoxy resins.

8. The printing ink according to claim 3 wherein the binder contains at least one resin selected from the group consisting of polyester resins, polyurethane resins, acrylic resins, vinyl chloride-vinyl acetate copolymers, cellulose derivative resins, polycarbonate resins, polyvinyl butyral resins, polyamide resins, and epoxy resins.

9. The printing ink according to claim 2, wherein the ink is applied to screen printing, gravure printing, and flexographic printing.

10. The printing ink according to claim 3, wherein the ink is applied to screen printing, gravure printing, and flexographic printing.

11. The printing ink according to claim 4, wherein the ink is applied to screen printing, gravure printing, and flexographic printing.

* * * * *